(12) United States Patent
Wintzen et al.

(10) Patent No.: US 7,173,647 B2
(45) Date of Patent: Feb. 6, 2007

(54) VIDEOPHONE

(75) Inventors: Eckart Joachim Wintzen, Driebergen (NL); Frederik Karel Kappetijn, Amsterdam (NL); Pieter Martinus Den Toonder, Dordrecht (NL)

(73) Assignee: Exovision, Austerlitz (NL)

( * ) Notice: Subject to any disclaimer, the term of this patent is extended or adjusted under 35 U.S.C. 154(b) by 0 days.

(21) Appl. No.: 10/853,744

(22) Filed: May 25, 2004

(65) Prior Publication Data

US 2005/0110865 A1    May 26, 2005

Related U.S. Application Data

(63) Continuation of application No. PCT/NL02/00767, filed on Nov. 26, 2002.

(30) Foreign Application Priority Data

Nov. 26, 2001    (NL)    .................................... 1019435

(51) Int. Cl.
*H04N 7/14*    (2006.01)
(52) U.S. Cl. ............................ 348/14.16; 348/14.01; 348/14.08
(58) Field of Classification Search ............ 348/14.01, 348/14.02, 14.03, 14.04, 14.05, 14.1, 14.13, 348/14.16; 379/202.01; 715/753; 370/260; 709/204
See application file for complete search history.

(56) References Cited

U.S. PATENT DOCUMENTS

| 4,821,307 | A | * | 4/1989 | Flint, III ................... 348/14.01 |
| 5,194,955 | A | * | 3/1993 | Yoneta et al. ............. 348/14.01 |
| 5,619,254 | A | * | 4/1997 | McNelley ................. 348/14.16 |
| 5,777,665 | A | | 7/1998 | McNelley et al. ............ 348/20 |
| 5,831,664 | A | | 11/1998 | Wharton et al. ............... 348/13 |
| 5,953,052 | A | * | 9/1999 | McNelley et al. ........ 348/14.16 |
| 6,005,604 | A | * | 12/1999 | Kakii ....................... 348/14.16 |
| 6,243,130 | B1 | | 6/2001 | McNelley et al. ............ 348/20 |
| 2002/0044199 | A1 | * | 4/2002 | Barzebar et al. ......... 348/14.01 |

FOREIGN PATENT DOCUMENTS

EP    454245 A2 *    10/1991

(Continued)

OTHER PUBLICATIONS

EU Search Report for PCT/NL App. No. 02/00767 (Feb. 18, 2003), 2 pages.

(Continued)

*Primary Examiner*—Melur Ramakrishnaiah
(74) *Attorney, Agent, or Firm*—Schwegman, Lundberg, Woessner & Kluth P.A.

(57) ABSTRACT

A videophone for communication with eye contact by means of image and/or sound includes image recording means for recording images, image reproducing means for reproducing an image recorded by another videophone, sound recording means for recording sound, sound reproducing means for reproducing sound recorded by another videophone, operating means for operating the functions of the videophone, and videophone enhancing means for enhancing image and/or sound quality, convenience of operation and/or use. Videophone enhancing means, in an option, includes a motor configured for moving the reflection device and/or the image reproducing device upward and/or downward for bringing to eye level an image reflected in the reflection device or a rotating unit configured for rotating the reflection device for the purpose of improving eye contact and enhancing convenience of use.

35 Claims, 10 Drawing Sheets

FOREIGN PATENT DOCUMENTS

| | | | | |
|---|---|---|---|---|
| EP | 633661 | A1 | * | 1/1995 |
| JP | 401239542 | A | * | 9/1989 |
| JP | 402119390 | A | * | 5/1990 |
| JP | 405207452 | A | * | 8/1993 |
| JP | 408106808 | A | * | 4/1996 |
| JP | 409008690 | A | * | 1/1997 |
| JP | 410282923 | A | * | 10/1998 |
| JP | 2000221597 | A | * | 8/2000 |
| JP | 2000307152 | A | * | 11/2000 |

OTHER PUBLICATIONS

Netherland Search Report from International Application No. NL 1021422, dated Jun. 26, 2003 (4 pages).

Whybray, M W., et al., "Videophony", *British Telecom Technology Journal*, vol. 8, No. 3, (Jul. 1990), 43-54.

* cited by examiner

VIDEOPHONE

CROSS REFERENCE TO RELATED APPLICATIONS

This application is a continuation under 35 U.S.C. 111(a) of PCT/NL02/00767, filed Nov. 26, 2002 and published in English on Jun. 5, 2003 as WO 03/047253 A1, which claimed priority under 35 U.S.C. 119 of The Netherlands Application No. 1019435, filed on Nov. 26, 2001, which applications and publication are incorporated herein by reference.

BACKGROUND OF THE INVENTION

The present application is generally direct to videophones, and, more particularly, to videophones providing improved eye contact between the users.

Despite the possibilities of video conferencing, great distances are still very frequently travelled, mainly in the business world but also in the private sphere, in order to have a more personal contact, this in spite of the increased danger of flying. Video conferencing equipment is generally considered unsatisfactory. Known from for instance the U.S. Pat. No. 5,777,665 is a videophone which can be placed on the desk of an executive and with which a reasonably good eye contact can be obtained with the person who also has such a videophone available. In a number of respects however this known videophone must be improved, for which purpose such a primitive and expensive device must approach perfect quality. Such aspects relate to for instance the positioning of the face in the image, the picture quality per se, easy operation of the diverse functions and/or the appearance of the device on the desk and the recorded image in relation to the surroundings.

SUMMARY OF THE INVENTION

The present invention therefore has for its object to improve the known videophone.

The present invention provides a videophone for communication with eye contact by means of image and/or sound, comprising:

image recording means for recording images;
image reproducing means for reproducing an image recorded by another videophone;
sound recording means for recording sound;
sound reproducing means for reproducing sound recorded by another videophone;
operating means for operating the functions of the videophone; and
videophone enhancing means for enhancing image and/or sound quality, convenience of operation and/or use.

Communication with eye contact is possible with a videophone according to the present invention, wherein drawbacks of existing videophones are also obviated, an improved convenience of operation is provided and an enhanced image and/or sound quality.

In a preferred embodiment the videophone enhancing means comprise motor means for moving the reflection means and/or the image reproducing means upward and/or downward for bringing to eye level an image reflected in the reflection means, so that eye contact is improved.

In a further preferred embodiment the videophone enhancing means comprise rotating means for rotating the reflection means for the purpose of improving eye contact and enhancing convenience of use, wherein the rotating means comprise a motor which is arranged in a hinge connected to the image reproducing means and the reflection means for motorized rotation of the reflection means, for instance between a closed position and an opened position wherein the angle between the reflection means and the image reproducing means can be chosen between 40° and 60°.

In a further preferred embodiment the videophone enhancing means comprise at least one light source which is arranged lower than the image reproducing means for the purpose of lighting the face of a user. The recorded image of the face thereby comes across better on another videophone by eliminating shadows.

In a further preferred embodiment the operating means comprise a remote control for remotely controlling the videophone via a wire or in wireless manner, thereby enhancing convenience of use.

In a further preferred embodiment the reflection means have a tapering form so that the reflection means are narrower on the underside thereof than on the top side in order to improve the perspective view of the reflected image.

In a further preferred embodiment the edge of the reflection means is at least partially transparent in order to create virtual presence of the reflected image.

According to a second aspect the present invention provides a method for manufacturing a videophone, comprising the steps of:

arranging at least partially transparent reflection means above image reproducing means in order to reflect the image reproduced by the image reproducing means;
arranging image recording means behind the reflection means;
arranging sound recording means for recording sound;
arranging sound reproducing means for reproducing sound recorded by another videophone;
arranging operating means for operating the functions of the videophone; and
arranging videophone enhancing means for enhancing image and/or sound quality, convenience of operation and/or use.

BRIEF DESCRIPTION OF THE DRAWINGS

Further advantages and features of the present invention will be elucidated in the following description of a preferred embodiment thereof with reference to the annexed figures, in which.

DETAILED DESCRIPTION

Figure 1:
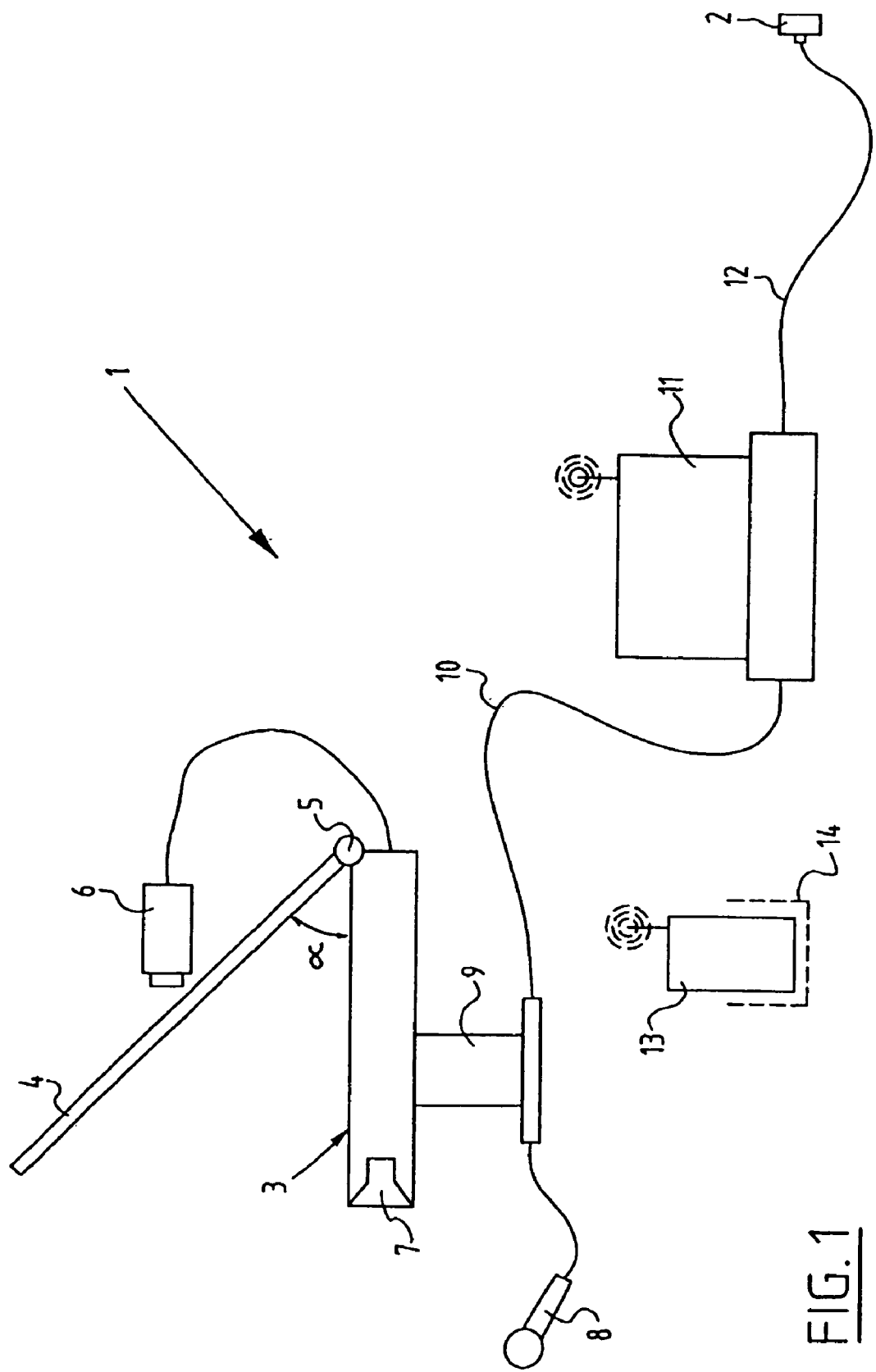
FIG. 1 shows a schematic overview of a videophone according to the present invention in a first preferred embodiment.

A videophone 1 according to the present invention makes it possible to communicate with eye contact (FIG. 1). A picture signal received via a network 2, for instance a LAN or the internet, is displayed for this purpose by the screen 3, for instance an LCD with a light intensity in the order of 1000–2000 Cd/m$^2$. In an option, the light intensity id about 1000–2000 Cd/m$^2$. The picture displayed by screen 3 is reflected in the partly light-transmitting mirror 4 described later, with a reflection/transmission ratio in the order of 50%/50%, wherein the angle $\alpha$ between screen 3 and the partly light-transmitting mirror 4 lies between 40° and 60°. In an option, the angle $\alpha$ lies between about 40° and 60°. The partly light-transmitting mirror is connected via a hinge 5 to screen 3, wherein a motor is arranged in the hinge so that the angle $\alpha$ between screen 3 and mirror 4 can be adjusted using the motor. A user of the videophone sees the reflected image, while a camera 6 arranged behind mirror 4 records the image of the user through the partly light-transmitting mirror. This camera arrangement enables users to have eye contact so that a more penetrating contact is possible than in known systems for video conferencing. For sound reproduction of received sound signals a loudspeaker 7 is arranged on the front of the videophone, just below the partly light-transmitting mirror 4 and the image reflected therein. The sound produced thus comes from the direction of the reflected image, so that the most natural possible situation is created. A microphone 8 picks up the sounds from a user.

The embodiment shown in FIG. 1 further comprises a base 9, described more extensively later, into which is incorporated a motor for moving upward or downward the screen 3, partly light-transmitting mirror 4 and camera 6, so that a user can bring the reflected image to a desired height using the motor so as to improve eye contact. Signals are transmitted from and to a separate enclosure 11 via a cable 10, which can optionally be replaced by a wireless connection to reduce the space taken up by the videophone 1 on a desk. Enclosure 11 comprises hardware and software programmed therein, for instance a codec for communication with network 2 via cable 12. Since enclosure 11 can be placed separately, it can be placed under a desk so that the occupied space on the desk is limited. Cable 12 is a so-called flat cable carrying both the picture and sound signals as well as the power supply signal of about 48 V. The connection for picture and sound signals to the network can likewise be made in wireless manner, for instance in order to enhance the appearance of the videophone. In order to achieve the enhanced image and/or sound quality large quantities of data must be transmitted, for instance in the order of magnitude of 0.5 to 2.5 Mbps (megabit per second). With future compression techniques these data speeds can be increased or decreased subject to the applications.

An external remote control 13, for instance a handheld computer with a touch screen, such as for instance a COMPAQ l-pack, HP Jornada, Pocket PC or Palmtop with a foot 14 developed by applicant, (remotely) operates the videophone. The developed software makes it possible, among other things, to use the remote control for personalization and for display of status information.

Figure 2:
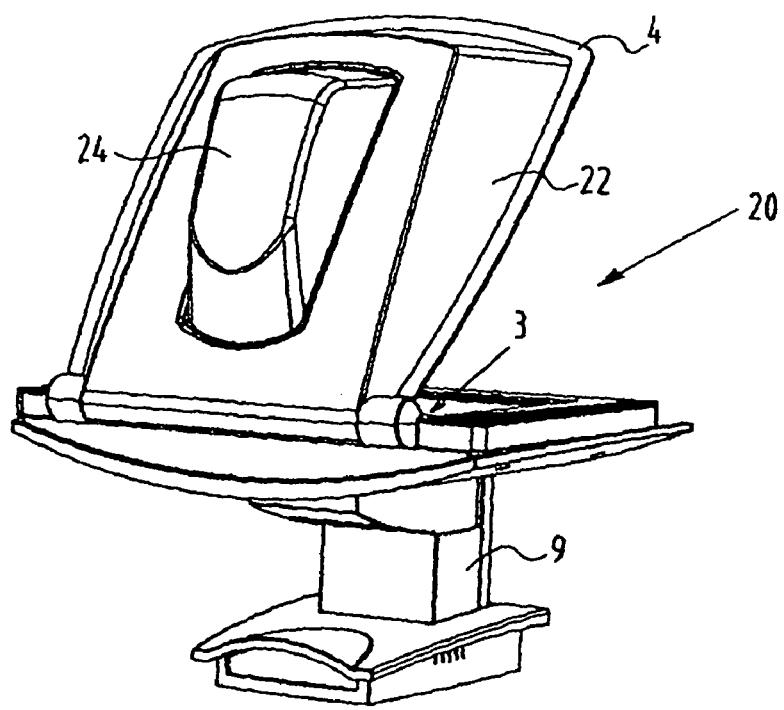
FIG. 2 is a rear view in perspective of a part of the videophone of FIG. 1 in a first state of use.

FIG. 2 shows a part 20 of videophone 1 that is placed on a desk. The hood 22 of plastic covers the rear side of the partly light-transmitting mirror 4 to screen off light. One component of hood 22 is the camera cover 24, which is optionally of transparent plastic to make the camera movements visible. A bellows (not shown) is in this case arranged round the camera to screen off light.

Figure 3:
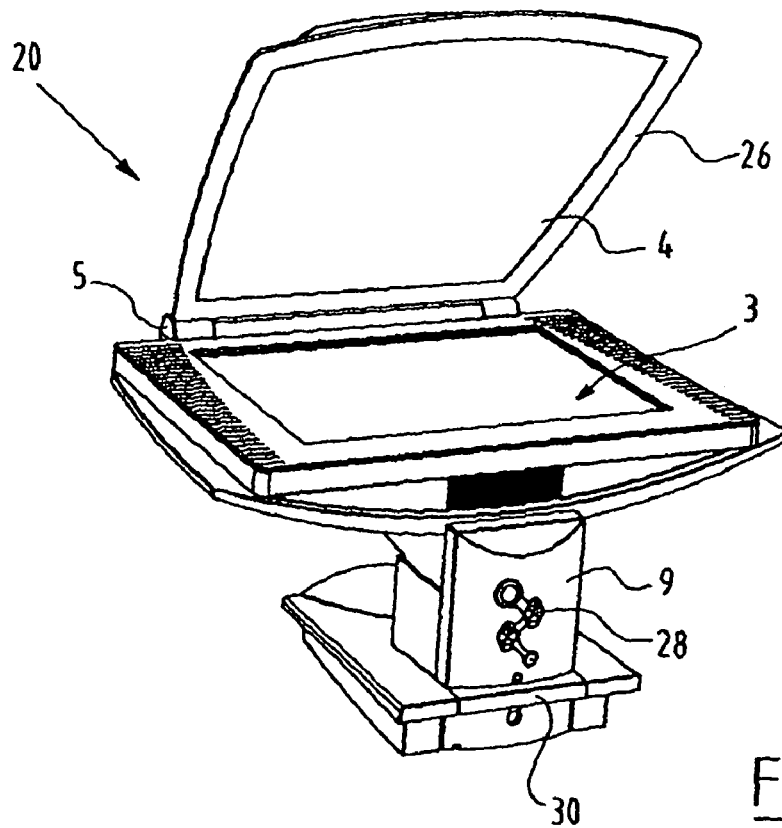
FIG. 3 is a front view in perspective of the part of the videophone of FIG. 2 in a first state of use.

FIG. 3 shows the part 20 in an opened position of use. The fan shape of the partly light-transmitting mirror 4 is clearly shown, wherein it is narrower on the underside at hinge 5 than on the top side in order to improve the perspective view of the reflected image and to create a more open view. The edge 26 is made transparent so that, through the absence of a clear outline frame, the reflected image appears to transpose into the room setting, thereby creating a sense of virtual presence. The partly light-transmitting mirror 4 is of a transparent material, for instance glass or polycarbonate of 2–4 mm thick, to which a reflecting material is applied, for instance silver. This reflective surface is protected against scratching, among other things, by a coating applied thereto of glass with a thickness of about 5–50 µm. The rear or non-visual side of the transparent material is roughened by for instance sandblasting or etching to eliminate second reflections in the transparent material. Base 9 further has the later elucidated control buttons 28 and light source 30.

Figure 4:
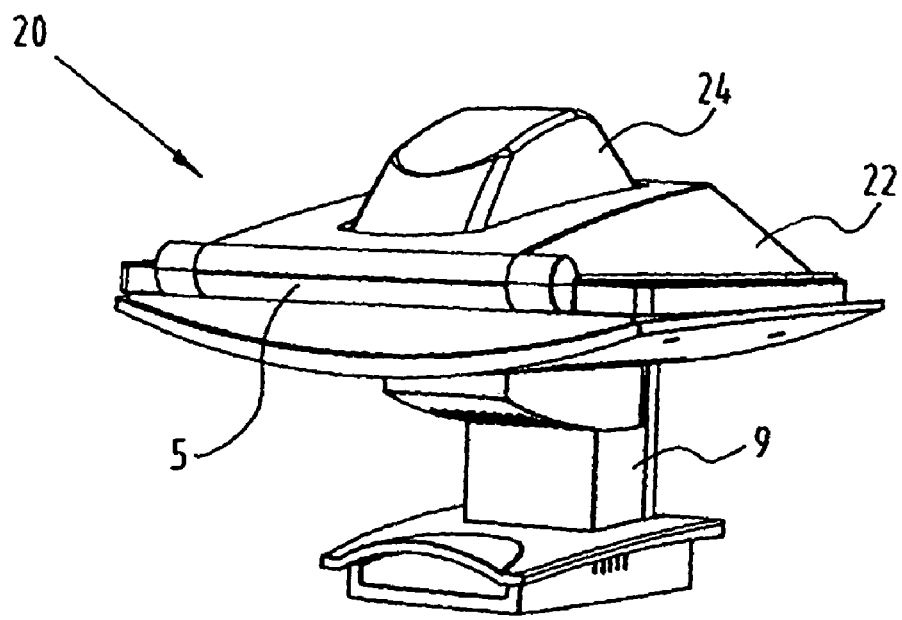
FIG. 4 is a rear view in perspective of the part of the videophone of FIG. 2 in a second state of use.
Figure 5:
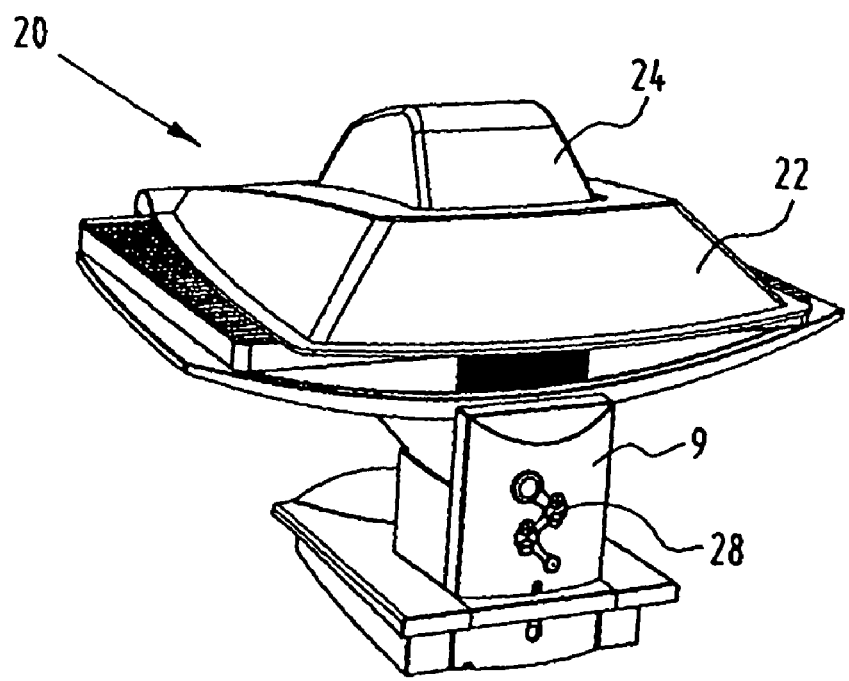
FIG. 5 is a front view in perspective of the part of the videophone of FIG. 2 in a second state of use.

FIGS. 4 and 5 show the part 20 in a closed state of use, wherein less space is taken up and the view is less obstructed, this being desirable if the videophone is not in use. The motor arranged in hinge 5 opens or closes hood 22 after operation of keys 28 or remote control 13. In a preferred embodiment opening proceeds automatically up to an angle $\alpha$ of 40°, whereafter a user can further adjust angle $\alpha$ between about 40° and 60°. This possibility of setting the angle ensures that a user can assume a more informal posture, which is essential for a relaxed conversation. The hood can be further opened to an angle $\alpha$ of 90° for servicing purposes.

Figure 6:
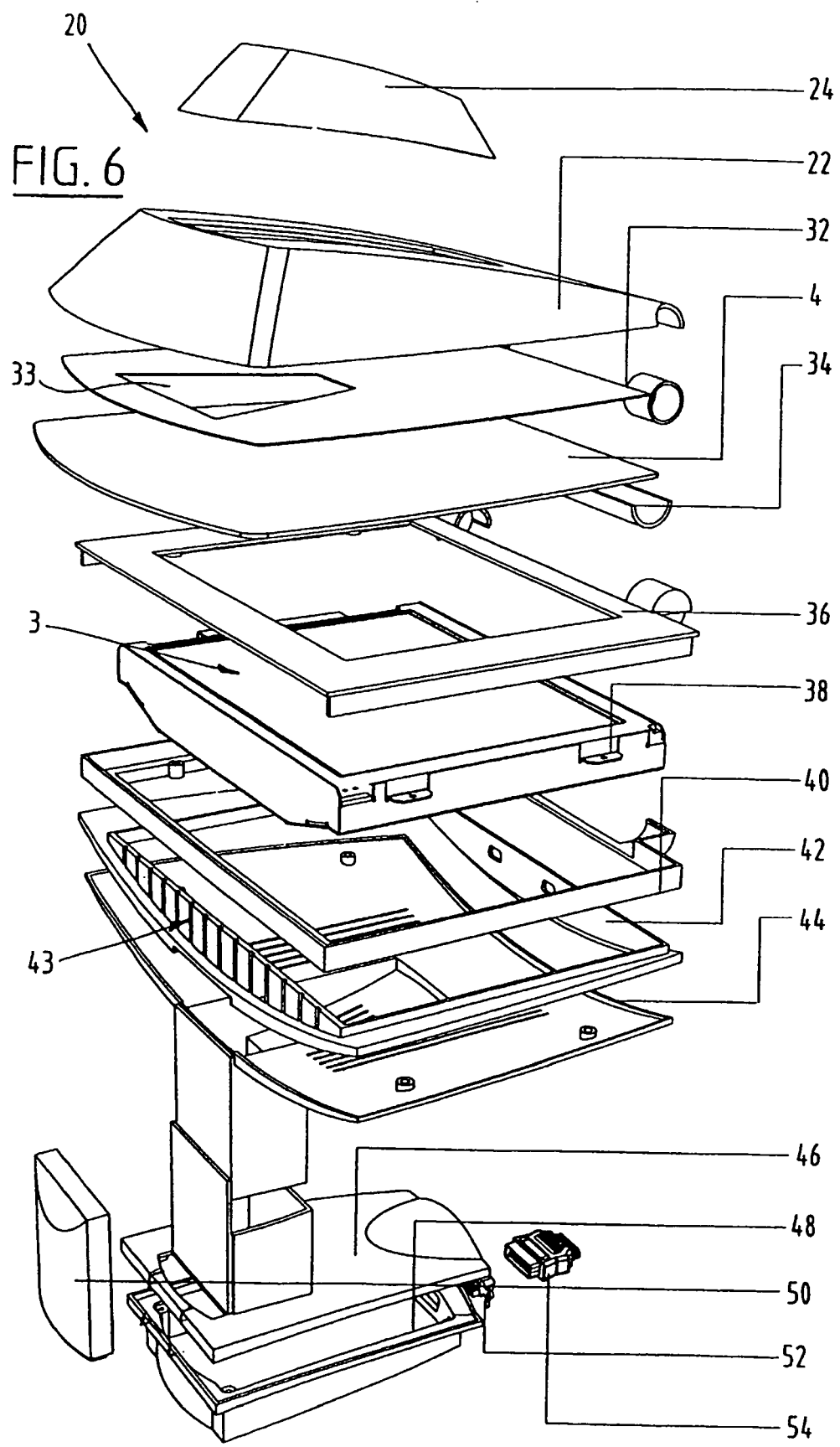
FIG. 6 shows an exploded perspective view of a part of the videophone according to the present invention in a first preferred embodiment.

FIG. 6 shows the hood 22 over mirror 4 and the camera cover 24, with the plate 32. Plate 32, for instance of a mixture of darker paint and plastic, is glued to the rear of the partly light-transmitting mirror 4 to exclude light. A recess 33 is arranged in plate 32 so that the camera (not shown) can be viewed therethrough. Casing 34 protects hinge 5. Screen 3 is covered with a frame 36 and received in the box 38 described below. Further components are the protective housing 40, the top 42 in which the box 38 is arranged with slots 43 to allow passage of sound from a loudspeaker (not shown). Situated thereunder is the protective base 44. Base 9 comprises an upper cap 46, a foot base 48, a control panel 50 and a female scart connection 52 to which a male scart plug 54 connects for transfer of signals.

Figure 7:
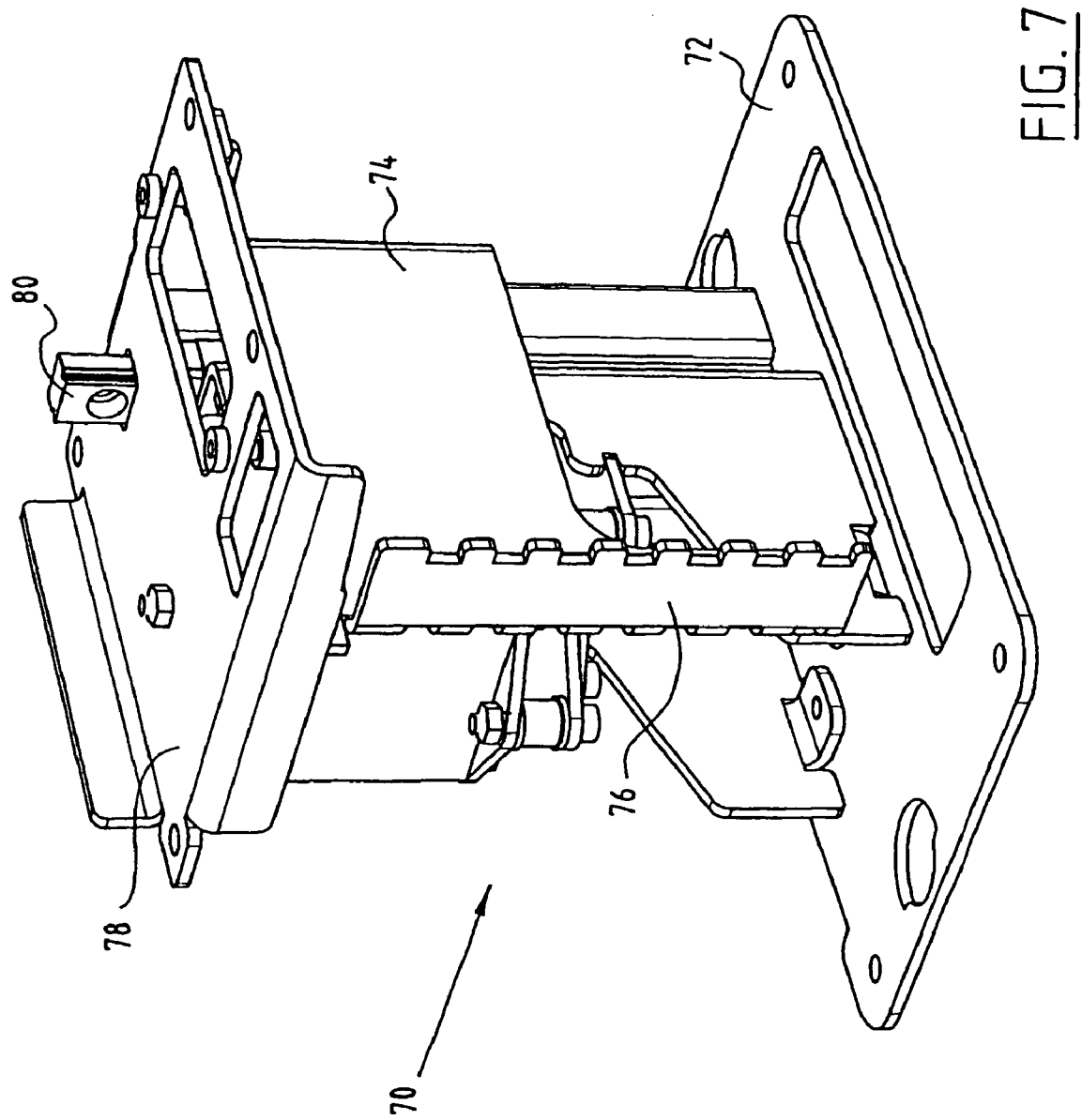
FIG. 7 shows a perspective view of means for moving upward or downward the image reproducing means of the videophone of FIG. 1 in a first preferred embodiment.

Situated inside base 9 is a mechanism 70 for adjusting the height (FIG. 7). Plate 72 is connected with screws (not shown) to foot base 48. A motor 74 can be activated by operating keys 28 or remote control 13, so that toothed wheels (not shown) engage on gear rack 76 so that the plate 78 having screwed thereon the protective base and the further upper part of the videophone, including the screen and the partly light-transmitting mirror, is moved upward or downward along the guide beam 80 to bring a reflected image to eye level.

Figure 8:
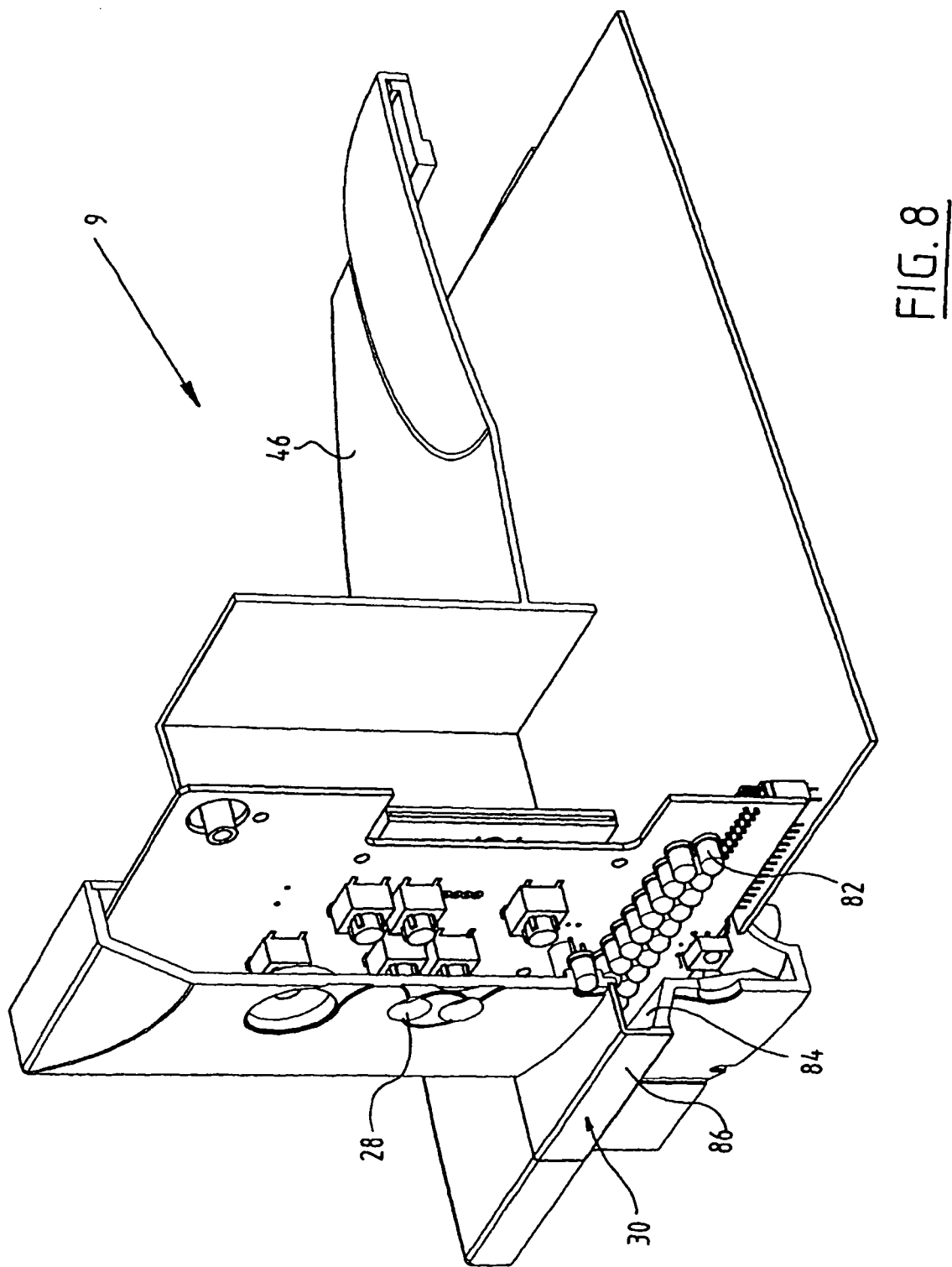
FIG. 8 is a cut-away view in perspective of a lowest part of the videophone of FIG. 1 in a first preferred embodiment.

In addition to control keys 28, there is arranged a light source 30 in base 9 (FIG. 8). Light source 30 consists of a number of LEDs 82, for instance 20, with a light intensity of about 60 Cd/M². The light therefrom is reflected upward through about 20° via a reflector 84 to light the face of a user, so that the recorded image thereof comes across better on another videophone by reducing shadows. LEDs 82 are screened by a cover 86 of transparent material, for instance plastic. The reflector and/or the LEDs can optionally be coloured for better lighting. There is also the possibility of dimming the LEDs to a desired light level.

Figure 9:
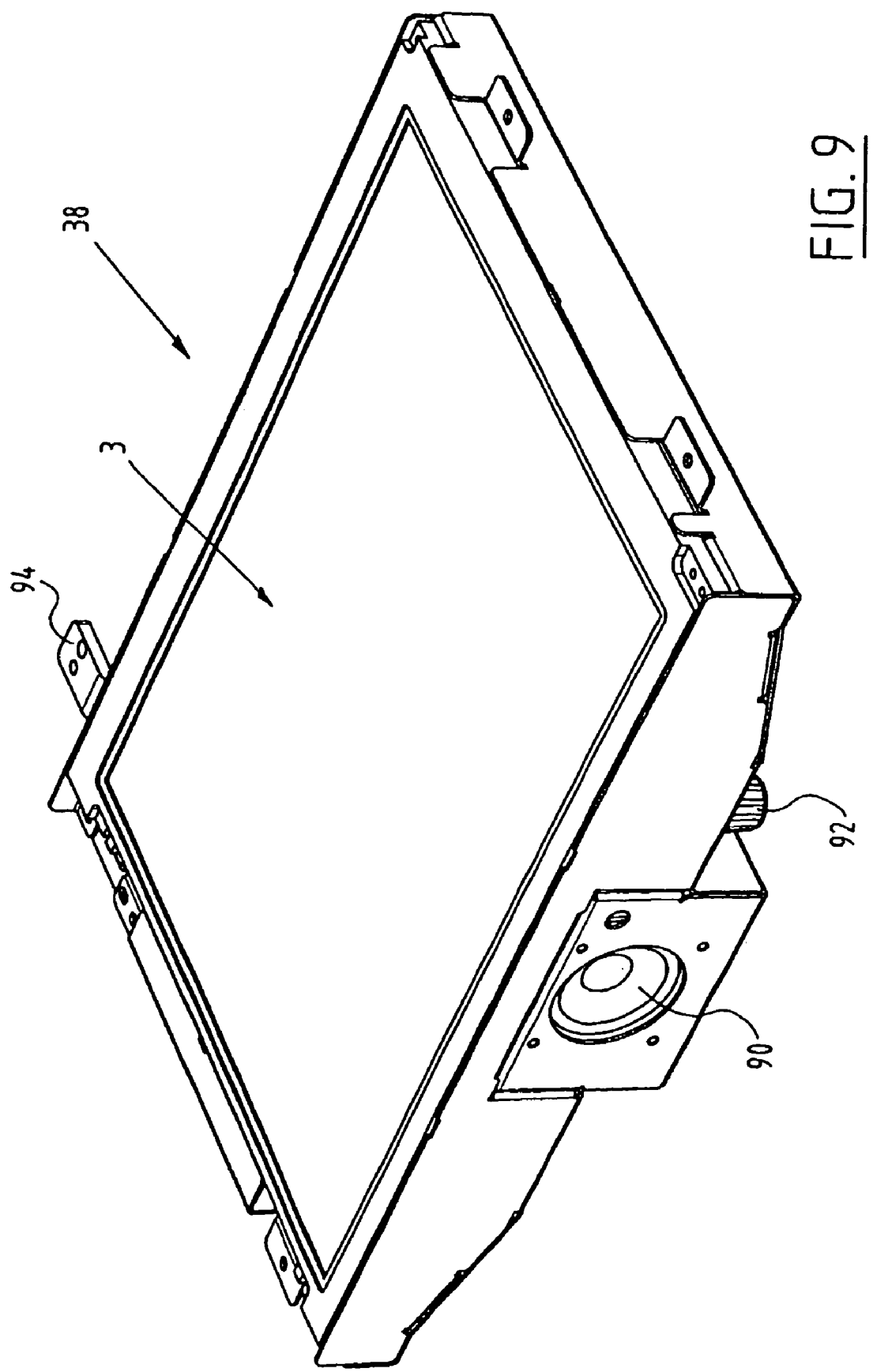
FIG. 9 is a view in perspective of the image reproducing means of the videophone of FIG. 1 in a first preferred embodiment.

Screen 3 is arranged in the box 38 (FIG. 9) so that the screen can be easily replaced and in order to shield electromagnetic radiation. The light from screen 3 should leave the screen at a small angle, since a user otherwise sees the image reflected in the mirror as well as the image on the screen. For this purpose a foil for blocking lateral light incidence is arranged in or on the screen. Both methods suffice, although if the foil is arranged on the screen a coating of glass is arranged thereover with a thickness of about 5–50 μm to protect the foil against scratching. On the front side of box 38 is arranged a loudspeaker 90 and a knob 92 for adjusting the brightness of the screen. Situated on the rear side is a protrusion 94 with two threaded holes on which engages the motor for rotating the mirror.

Figure 10:
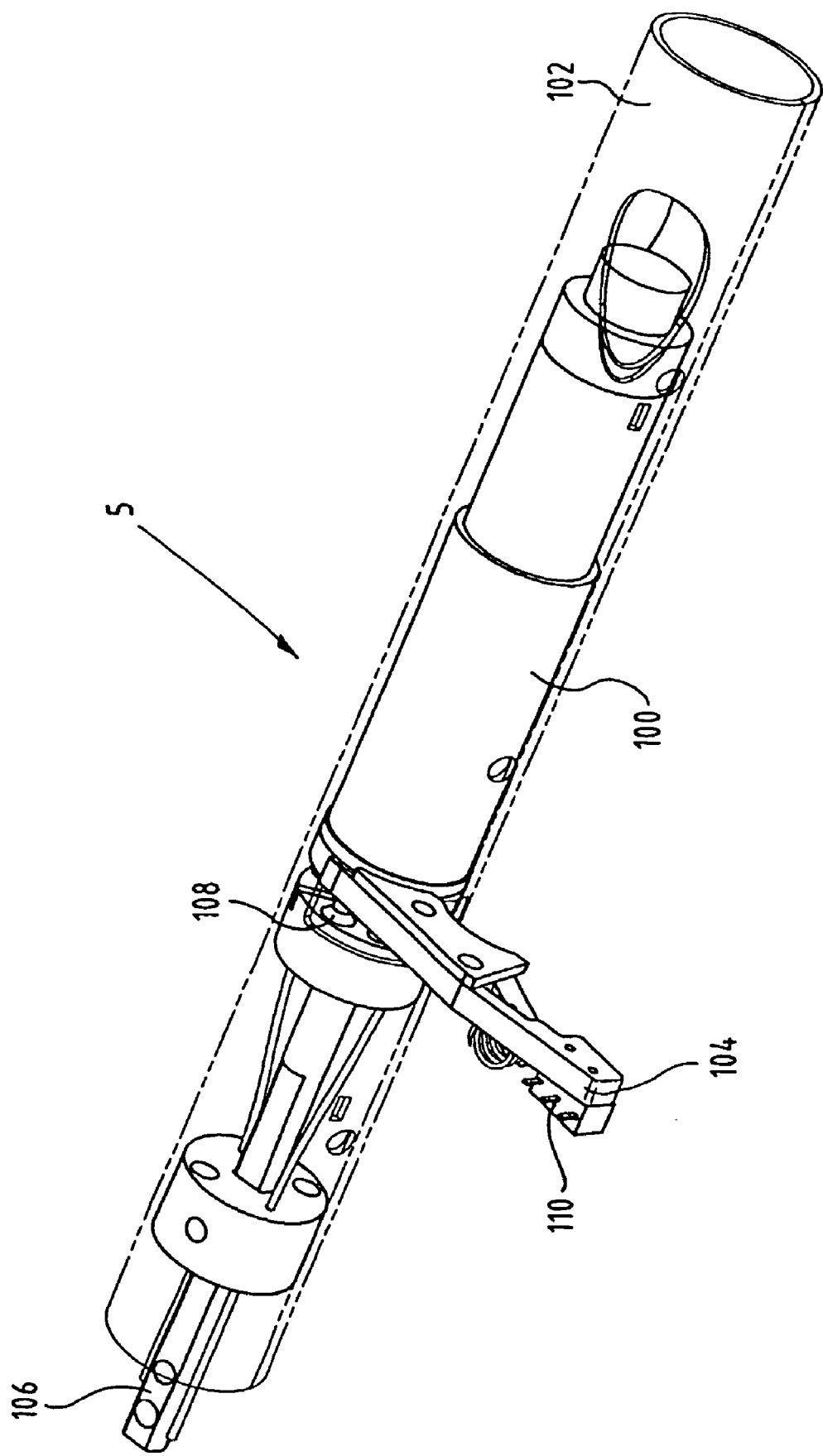
FIG. 10 is a cut-away view in perspective of rotating means of the videophone of FIG. 1 in a first preferred embodiment.

Motor 100 is arranged in a tube 102 of hinge 5 in order to rotate the arm 104, which is mounted on cover plate 32 round the partially light-transmitting mirror 4, relative to the flattened rod 106 fastened with screws (not shown) to protrusion 94 (FIG. 10). Tube 102 has for this purpose a slot-like recess 108 through which the arm 104 protrudes. Situated on arm 104 is a plug 110 for through-feed of signals and supply voltage.

Figure 11:
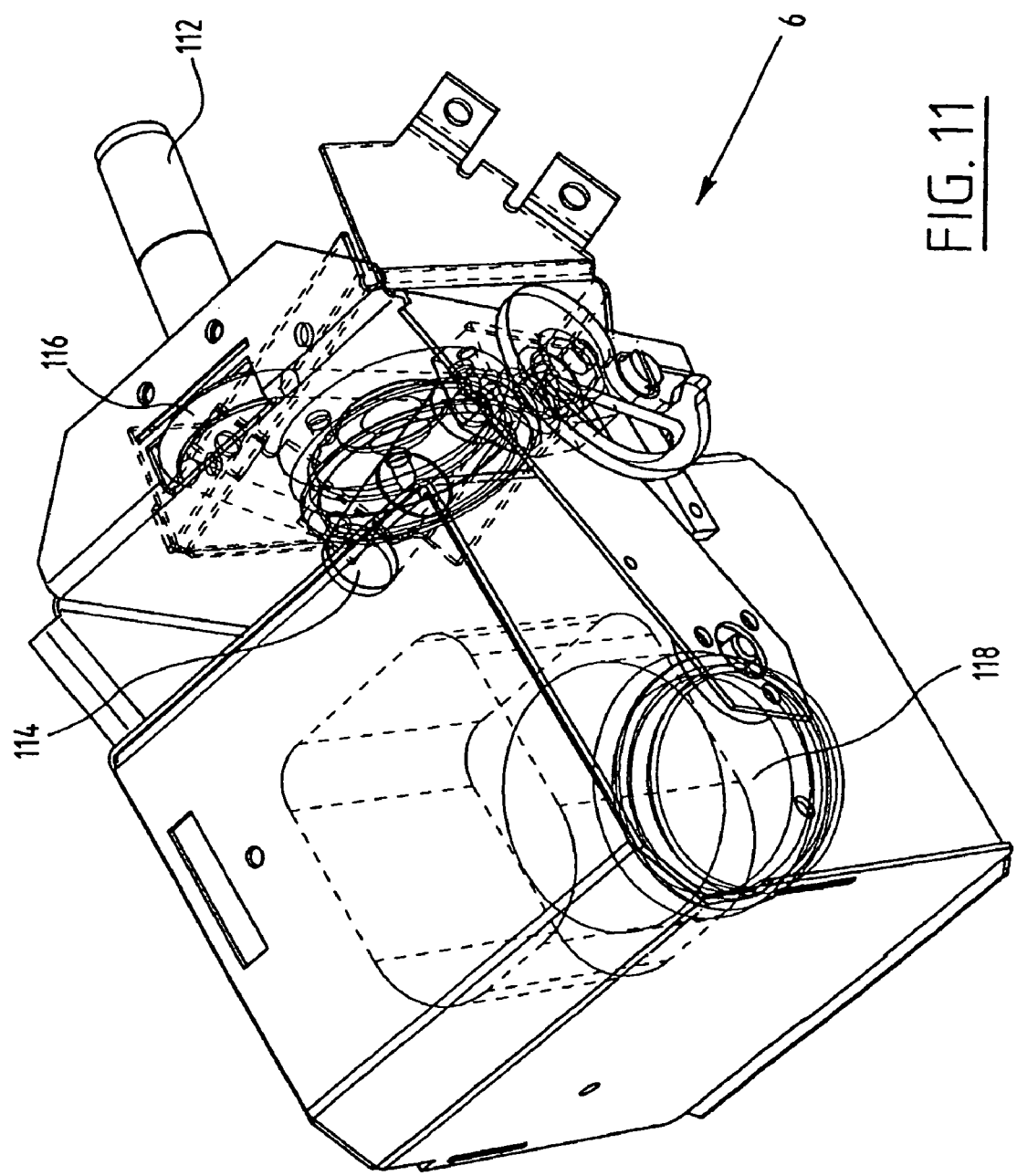
FIG. 11 is a view in perspective of the image recording means of the videophone of FIG. 1 in a first preferred embodiment.

Camera 6, for instance from Sony, comprises two motors 112 and 114, wherein motor 112 engages via a belt 116 onto the camera, so that the lens 118 can move upward or downward as well as to the left and right (FIG. 11). A control module arranged in the separate enclosure 11 drives the motors 112 and 114 such that a user remains in the middle of the picture by causing the camera to follow all his/her movements.

Figure 12:
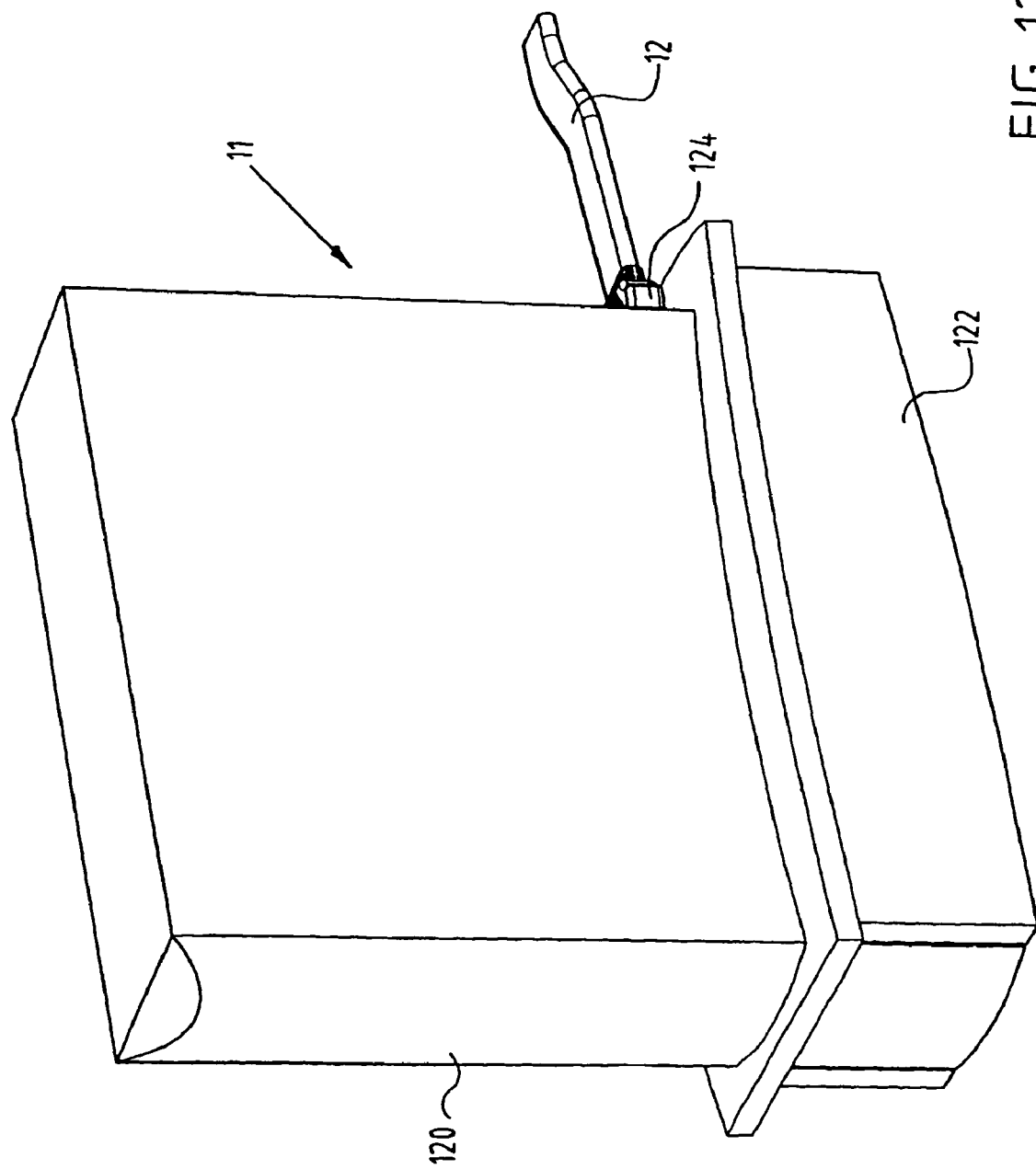
FIG. 12 is a view in perspective of a unit for separate placing for the videophone of FIG. 1 in a first preferred embodiment.

The enclosure 11 for separate placing comprises an upper part 120 and a foot 122, for instance of plastic. Arranged in the enclosure, among other things, are modules for actuating the camera movement, for actuating the screen and the loudspeaker, for receiving sound signals from the microphone and for coding and decoding image and sound signals for information exchange via a network (codec). Any codec which is suitable for audio/video, for instance from Sony, Tandberg or Polycom, is suitable for the videophone according to the present invention. FIG. 12 further shows the flat cable 12 for the picture and sound signals and for the supply voltage with a scart connection 124.

A videophone according to the above described preferred embodiment has the possibility of making eye contact, wherein existing systems are also improved, for instance in relation to image and sound quality and convenience of use.

Embodiments of the present invention further include methods for manufacturing a videophone as described herein. Some embodiments of the present invention include remotely actuating a videophone as described herein, for example with a portable electronic device. Options for a portable electronic device include a palmtop or similar device.

The present invention is not limited to the above described preferred embodiment thereof; the rights sought are defined by the following claims, within the scope of which many modifications can be envisaged.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The invention claimed is:

1. A videophone for communication with eye contact by means of image and sound, comprising:
   image recording device configured for recording images;
   image reproducing device configured for reproducing an image recorded by another videophone, wherein the image reproducing device comprises an LCD screen;
   an at least partially transparent reflection device configured for reflecting the image reproduced by the image reproducing device, wherein the angle between the image reproducing device and the at least partially transparent reflective surface is adjustable;
   sound recording device configured for recording sound;
   sound reproducing device configured for reproducing sound recorded by another videophone;
   operating device configured for operating the functions of the videophone;
   a first part housing the image recording device, the image reproducing device, the reflection device, the sound recording device, the sound reproducing device and the operating device; and
   a second part in communication with the first part, the second part housing:
      a videophone enhancing device configured for enhancing image and sound quality, convenience of operation and use; and
      a communications device comprising programmable hardware and software.

2. The videophone of claim 1, wherein the videophone enhancing device comprises a motor configured for moving the reflection device and the image reproducing device upward and downward for bringing to eye level an image reflected in the reflection device.

3. The videophone of claim 1, wherein the videophone enhancing device comprises a rotating unit configured for rotating the reflection device for the purpose of improving eye contact and enhancing convenience of use, and wherein the rotating device comprises motor which is arranged in a hinge connected to the image reproducing device and the reflection device for motorized rotation of the reflection device, for instance between a closed position and an opened position wherein an angle between the reflection device and the image reproducing device is in the range of about 40° and 60°.

4. The videophone of claim 1, wherein the videophone enhancing device comprises at least one light source which is arranged lower than the image reproducing device and is configured to light a face of a user.

5. The videophone of claim 4, wherein the light source comprises at least one cold light source including at least 20 LEDs with a light intensity of about 60 Cd/m².

6. The videophone of claim 5, wherein the reflector device is configured as a color reflector and is arranged lower than the LEDs for reflecting the light upward over an angle of about 20°, and wherein the LEDs are configured to be colored and the light intensity thereof is adjustable.

7. The videophone of claim 1, wherein the operating device comprises a remote control for remotely controlling the videophone via a wire or in wireless manner.

8. The videophone of claim 7, wherein the remote control comprises a palmtop electronic device and, wherein the screen thereof is a touch screen and is used to operate the videophone.

9. The videophone of claim 1, wherein the reflection device is narrower on an underside thereof than on a top side in order to improve the perspective view of a reflected image.

10. The videophone of claim 1, wherein the reflection device comprises a panel of an optically transparent material, with a thickness of for instance 2–4 mm, wherein a reflecting layer is applied to the transparent material for the reflecting action thereof in a reflection/transmission ratio within a range of 30%/70% to 70%/30%, subject to the chosen image reproducing device and image recording device.

11. The videophone of claim 10, wherein the reflective layer of the reflection device is protected by a coating applied thereto of glass with a thickness in the order of 5–50 µm.

12. The videophone of claim 1, wherein the reflection device includes an edge that is at least partially transparent in order to create virtual presence of a reflected image.

13. The videophone of claim 10, wherein the panel includes a partially roughed, rear surface on a non-visual rear side of the panel, the partially roughed surface including a small area in the middle for viewing therethrough by the image recording device, and wherein a light-intercepting material is applied to the rear surface of the panel to prevent light incidence through the rear surface.

14. The videophone of claim 1, wherein the LCD screen includes a means for adjusting the light configured to block light directly projecting in the direction of a user.

15. The videophone of claims 1, wherein the LCD screen includes extra lamps configured to increase the brightness to a light intensity of about 1000–2000 $Cd/m^2$.

16. The videophone of claim 14, wherein LCD screen includes a coating of glass applied to the means for adjusting the light incidence in order to protect against scratching thereof.

17. The videophone of claim 1, wherein the image recording device comprises a camera which co-displaces with movements of a user in order to hold a face of the user in the middle of a viewfinder.

18. The videophone of claim 1, wherein the sound reproducing device comprises a first loudspeaker and a second loudspeaker.

19. The videophone of claim 18, wherein the first loudspeaker is arranged lower than the reflection device such that the sound thereof comes from the direction of a reflected image.

20. The videophone of claim 1, further comprising a flat cable for supplying signals.

21. The videophone of claim 1, wherein the videophone also serves as terminal, for instance for displaying information services and help-desk functions.

22. The videophone of claim 1, wherein the sound reproducing device comprises a headphone and wherein the videophone enhancing device comprises at least one light source which is arranged lower than the image reproducing device and is configured to light a face of a user.

23. The videophone of claim 1, further comprising a unit for placing separately for arranging therein modules, so that the videophone occupies less space.

24. The videophone of claim 23, wherein the modules comprise a codec for transmitting and receiving via a wire or in wireless manner of signals to and from a network, wherein the videophone can actuate the codec for audio/video.

25. The videophone of claim 1, further comprising a cover arranged on the non-visual side of the reflection device to protect the image recording device, wherein the cover is at least partly transparent so that the movements of the image recording device can be monitored.

26. A method for manufacturing a videophone, comprising:
arranging at least partially transparent reflection device above image reproducing device in order to reflect the image reproduced by the image reproducing device;
arranging the at least partially transparent reflection device and the image reproducing device such that the angle between the image reproducing device and the at least partially transparent reflective surface is adjustable;
arranging image recording device behind the reflection device;
arranging sound recording device for recording sound;
arranging sound reproducing device for reproducing sound recorded by another videophone;
arranging operating device for operating the functions of the videophone;
arranging a first part housing all previously mentioned components; and
arranging a second part in communication with the first part and housing a videophone enhancing device configured for enhancing image and sound quality, convenience of operation and use and a communications device, comprising programmable hardware and software; and
moving at least one of the reflection device and the image reproducing device to a selected level.

27. The method for manufacturing a videophone of claim 26, comprising:
arranging means for moving at least one of the reflection device and the image reproducing device vertically upward and downward in order to bring to eye level an image reflected in the reflection device.

28. The method for manufacturing a videophone of claim 26, comprising: arranging a rotating device for rotating the reflection device for the purpose of improving eye contact and enhancing convenience of use, wherein the rotating device comprises a motor which is arranged in a hinge connected to the image reproducing device and the reflection device for motorized rotation of the reflection device, for instance between a closed position and an opened position wherein the angle between the reflection device and the image reproducing device can be chosen between 40° and 60°.

29. The method for manufacturing a videophone of claim 28, wherein the videophone enhancing device comprises at least one light source which is arranged lower than the image reproducing device for the purpose of lighting the face of a user.

30. The method for manufacturing a videophone of claim 29, wherein the at least one light source is a LED, for instance 20 LEDs with a light intensity of about 60 $Cd/m^2$, also comprising the step of arranging a colored reflector at a position lower than the LEDs for reflecting light upward over an angle of for instance 20°, and wherein the LEDs can be colored and the light intensity thereof is adjustable.

31. The method for manufacturing a videophone of claim 30, wherein the operating device comprises a remote control for remotely controlling the videophone via a wire or in wireless manner.

32. The method for manufacturing a videophone of claim 31, wherein the reflection device has a tapering form so that the reflection device is narrower on the underside thereof than on the top side in order to improve the perspective view of the reflected image.

33. The method for manufacturing a videophone of claim 26, wherein an edge of the reflection device is made at least partially transparent in order to create virtual presence of the reflected image.

34. A videophone for audio and video communication, comprising:

an image recording device;

an image reproducing device configured for reproducing an image recorded by another videophone, wherein the image reproducing device includes an at least partially transparent reflection device configured for reflecting an image, wherein the angle between the image reproducing device and the at least partially transparent reflective surface is adjustable;

a microphone;

a speaker configured for reproducing sound recorded by another videophone;

an operating device operably connected to and controlling operation of the image recording device, the image reproducing device the microphone, and the speaker;

means for moving at least one of the reflection device and the image reproducing device to bring to eye level an image reflected in the reflection device;

a first part housing all previously mentioned components; and a second part in communication with the first part, the second part housing a videophone enhancing device configured for enhancing image and sound quality, convenience of operation and use and housing a communications device, comprising programmable hardware and software.

35. The videophone of claim 1, wherein the sound reproducing device comprises a loudspeaker.

* * * * *